United States Patent
Ikram (10) Patent No.: US 9,225,843 B2
(45) Date of Patent: Dec. 29, 2015

(54) METHOD, SYSTEM AND COMPUTER PROGRAM PRODUCT FOR ACOUSTIC ECHO CANCELLATION

(71) Applicant: Texas Instruments Incorporated, Dallas, TX (US)

(72) Inventor: Muhammad Z. Ikram, Richardson, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 112 days.

(21) Appl. No.: 13/629,035

(22) Filed: Sep. 27, 2012

(65) Prior Publication Data

US 2013/0077776 A1 Mar. 28, 2013

Related U.S. Application Data (60) Provisional application No. 61/540,331, filed on Sep. 28, 2011.

(51) Int. Cl.
*H04M 9/08* (2006.01)

(52) U.S. Cl.
CPC .................................. *H04M 9/082* (2013.01)

(58) Field of Classification Search
CPC ....... H04M 9/082; H04M 3/002; H04M 1/20; H04M 1/605; H04M 9/08; H04M 1/035; H04M 1/6033; H04M 1/6008; H04M 1/6016; H04M 3/56; H04M 9/085; H04M 1/60; H04R 3/005; H04R 3/02; H04R 3/00; H04R 2410/05; H04R 5/027; H04R 2410/07; H04R 2430/23; H04R 2430/25; G10L 2021/02082; G10L 21/0208; H04B 3/234
USPC .................. 379/406.01–406.16; 455/570; 370/286–290
See application file for complete search history.

(56) References Cited

U.S. PATENT DOCUMENTS

| | | | | |
|---|---|---|---|---|
| 6,954,530 B2* | 10/2005 | Gunther | .............. | H04M 9/082 379/406.02 |
| 2004/0001597 A1* | 1/2004 | Marton | .............. | H04M 9/082 381/71.1 |
| 2008/0159552 A1* | 7/2008 | Guerin | .............. | H04M 9/082 381/66 |
| 2009/0323924 A1* | 12/2009 | Tashev | .............. | H04M 9/082 379/406.05 |

OTHER PUBLICATIONS

Gay et al., "Acoustic Signal Processing for Telecommunication", 2000, pp. 1-19 and 80-97, Chapters 1 and 5, Kluwer Academic, Norwell, MA.

Ikram, et al.. "Permutation Inconsistency in Blind Speech Separation: Investigation and Solutions", IEEE Transactions on Speech and Audio Processing, Jan. 2005, pp. 1-13, vol. 13, No. 1, IEEE.

(Continued)

*Primary Examiner* — Akelaw Teshale
(74) *Attorney, Agent, or Firm* — Michael A. Davis, Jr.; Frank D. Cimino (57) ABSTRACT

In response to a first signal, a first sound wave is output. A second sound wave is received that includes an acoustic echo of the first sound wave. In response to the second sound wave, a second signal is output that cancels an estimate of the acoustic echo. The estimate of the acoustic echo is iteratively adapted to increase a statistical independence between the first and second signals, irrespective of whether a first voice is present in the first sound wave, and irrespective of whether a second voice is present in the second sound wave.

27 Claims, 3 Drawing Sheets

(56) References Cited

OTHER PUBLICATIONS

Lee et al., "Frequency-Domain Double-Talk Detection Based on the Gaussian Mixture Model", IEEE Signal Processing Letters, May 2010, pp. 453-456, vol. 17, No. 5, IEEE.

Oka et al., "A Step Size Control Method Steadily Reducing Acoustic Echo Even During Double-Talk", International Symposium on Intelligent Signal Processing and Communication Systems, 2008, entire document, IEEE, Bangkok, Thailand.

Buchner et al.. Robust Extended Multidelay Filter and Double-Talk Detector for Acoustic Echo Cancellation, IEEE Transactions on Audio, Speech, and Language Processing, Sep. 2006, pp. 1633-1644, vol. 14, No. 5. IEEE.

Gänsler et al., "Double-Talk Robust Fast Converging Algorithms for Network Echo Cancellation", IEEE Transactions on Speech and Audio Processing, Nov. 2000, pp. 656-663, vol. 8, No. 6, IEEE.

Paleologu et al., "Double-Talk Robust VSS-NLMS Algorithm for Under-Modeling Acoustic Echo Cancellation", IEEE International Conference on Acoustics, Speech and Signal Processing, 2008, pp. 245-248, IEEE.

Gunther, Jake, "Learning Echo Paths During Continuous Double-Talk Using Semi-Blind Source Separation", IEEE Transactions on Audio, Speech, and Language Processing, Feb. 2012, pp. 646-660, vol. 20, No. 2, IEEE.

\* cited by examiner

METHOD, SYSTEM AND COMPUTER PROGRAM PRODUCT FOR ACOUSTIC ECHO CANCELLATION

CROSS-REFERENCE TO RELATED APPLICATION

This application claims priority to U.S. Provisional Patent Application Ser. No. 61/540,331, filed Sep. 28, 2011, entitled METHOD FOR IMPROVED DOUBLE-TALK HANDLING AND FAST CONVERGENCE IN ACOUSTIC ECHO CANCELLERS, naming Muhammad Ikram as inventor, which is hereby fully incorporated herein by reference for all purposes.

BACKGROUND

The disclosures herein relate in general to audio processing, and in particular to a method, system and computer program product for acoustic echo cancellation.

In full duplex communication between telephones, a double-talk condition occurs if users concurrently speak into respective microphones of the telephones. Those microphones may receive acoustic echo from respective loud speakers of the telephones. To cancel the acoustic echo, the telephones may compute an estimate of the acoustic echo using a normalized least-mean squares ("NLMS") technique, but such technique is less accurate while a double-talk condition occurs.

SUMMARY

In response to a first signal, a first sound wave is output. A second sound wave is received that includes an acoustic echo of the first sound wave. In response to the second sound wave, a second signal is output that cancels an estimate of the acoustic echo. The estimate of the acoustic echo is iteratively adapted to increase a statistical independence between the first and second signals, irrespective of whether a first voice is present in the first sound wave, and irrespective of whether a second voice is present in the second sound wave.

DETAILED DESCRIPTION

Figure 1:
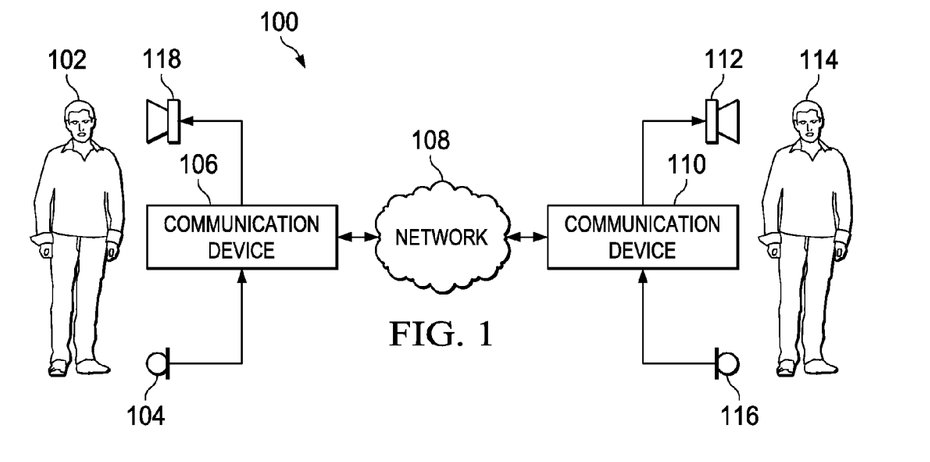
FIG. 1 is a block diagram of an information handling system of the illustrative embodiments.

FIG. 1 is a block diagram of an information handling system, indicated generally at 100, of the illustrative embodiments. A human user 102 is able to speak into a microphone 104. The microphone 104 converts, into electrical signals, a sound wave of an environment around the microphone 104, such as (if present): (a) a voice (e.g., speech) of the user 102, which is a potential source of the sound wave; (b) music; and (c) ambient noise. A communication device 106: (a) receives the electrical signals from the microphone 104; (b) processes the electrical signals to cancel at least some of any acoustic echo therein; (c) in response thereto, encodes suitable digital information that is representative of such processed electrical signals; and (d) outputs such information through a network 108 to a communication device 110.

Figure 2:
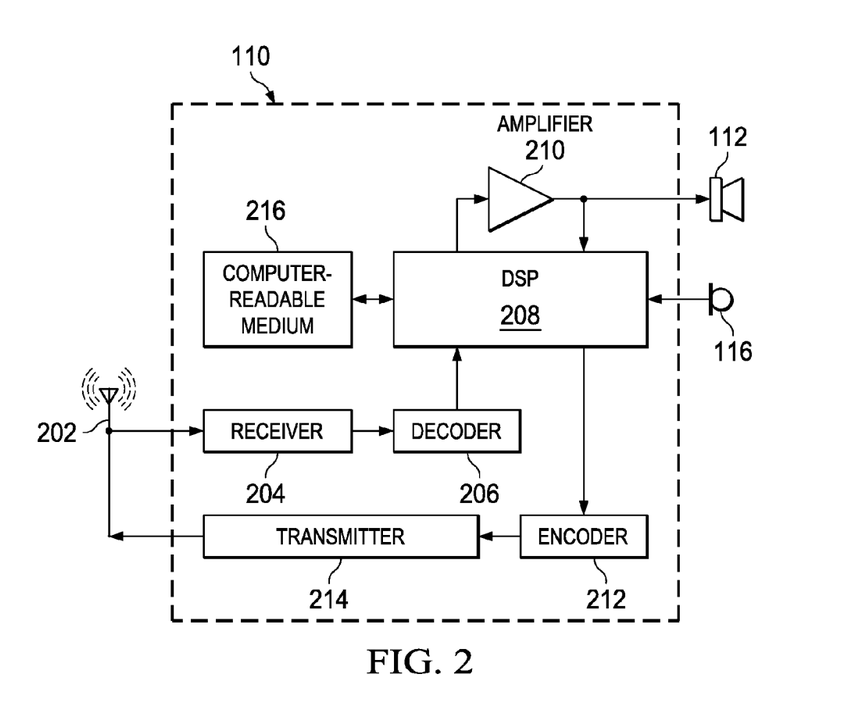
FIG. 2 is a block diagram of a communication device of the system of FIG. 1.

FIG. 2 is a block diagram of the communication device 110, which is a representative one of the communication devices 106 and 110. Referring also to FIG. 1, via an antenna 202, a receiver 204 receives such information as wireless telecommunication signals from the communication device 106 through the network 108. In an alternative embodiment, the receiver 204 receives such information from the communication device 106 through the network 108 via a wireline and/or optical fiber cable. The receiver 204 outputs such information to a decoder 206, which decodes such information.

A digital signal processor ("DSP") 208: (a) receives the decoded information from the decoder 206; (b) processes the decoded information to suppress at least some ambient noise therein from the environment around the microphone 104; and (c) in response thereto, causes an amplifier ("AMP") 210 to output suitable electrical signals (to a speaker 112) that are representative of such processed information. Also, the DSP 208 receives those electrical signals from the amplifier 210, so that the DSP 208 controls those electrical signals in a feedback loop. In response to those electrical signals from the amplifier 210, the speaker 112 outputs a sound wave, which is at least partially audible to a human user 114. Accordingly, those electrical signals from the amplifier 210 communicate the sound wave of the environment around the microphone 104 (e.g., the voice, if present, of the user 102), while suppressing at least some ambient noise therein.

Similarly, the human user 114 is able to speak into a microphone 116. The microphone 116 converts, into electrical signals, a sound wave of an environment around the microphone 116, such as (if present): (a) a voice (e.g., speech) of the user 114, which is a potential source of the sound wave; (b) music; and (c) ambient noise. The DSP 208: (a) receives the electrical signals from the microphone 116; (b) processes the electrical signals to cancel at least some of any acoustic echo therein; and (c) in response thereto, causes an encoder 212 to encode suitable digital information that is representative of such processed electrical signals. A transmitter 214: (a) receives such information from the encoder 212; and (b) via the antenna 202, outputs such information as wireless telecommunication signals through the network 108 to the communication device 106. In an alternative embodiment, the transmitter 214 outputs such information through the network 108 to the communication device 106 via a wireline and/or optical fiber cable.

The communication device 106: (a) receives such information from the communication device 110 through the network 108; (b) decodes such information; (c) processes the decoded information to suppress at least some ambient noise therein from the environment around the microphone 116; and (d) in response thereto, outputs suitable electrical signals (to a speaker 118) that are representative of such processed information. In response to those electrical signals from the communication device 106, the speaker 118 outputs a sound wave, which is at least partially audible to the human user 102. Accordingly, those electrical signals from the communication device 106 communicate the sound wave of the environment around the microphone 116 (e.g., the voice, if present, of the user 114), while suppressing at least some ambient noise therein.

As discussed hereinabove, the representative communication device 110 includes various electronic circuitry components for performing its operations. For example, the DSP 208 is a computational resource for executing and otherwise processing instructions, and for performing additional operations (e.g., communicating information) in response thereto. Accordingly, the DSP 208 receives instructions of computer-readable software programs that are stored on a computer-readable medium 216 (e.g., a nonvolatile memory device) of the communication device 110. In response to such instructions, the DSP 208 executes such programs and performs its operations. For executing such programs, the DSP 208 processes data, which are stored in a memory of the DSP 208 and/or in the computer-readable medium 216.

In the illustrative embodiments, the network 108 includes: (a) a mobile (e.g., cellular) telephone network; (b) a landline telephone network; and/or (c) a computer network, such as a Transport Control Protocol/Internet Protocol ("TCP/IP") network (e.g., the Internet or an intranet). In one embodiment, the representative communication device 110 is a telephone, which is housed integrally with the speaker 112 and the microphone 116. In a first example, the speaker 112 is a loud speaker of the telephone. In a second example, the speaker 112 is an ear speaker of the telephone.

Figure 3:
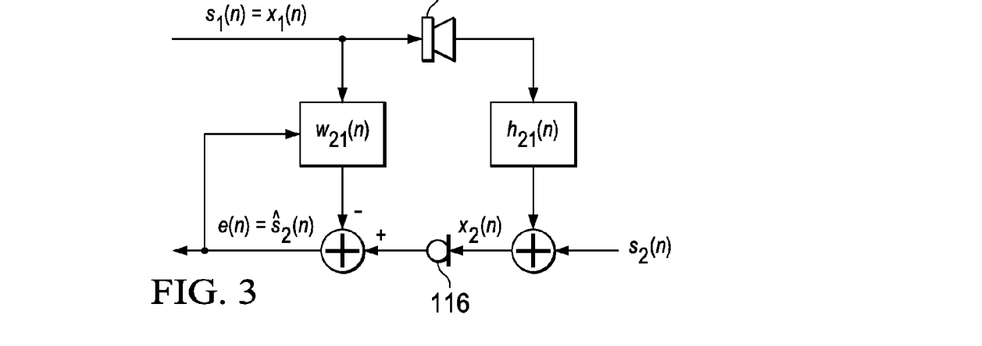
FIG. 3 is an information flow diagram of an acoustic echo cancellation ("AEC") operation of the system of FIG. 1.

FIG. 3 is an information flow diagram of an acoustic echo cancellation ("AEC") operation of the DSP 208. As represented in the information flow diagram of FIG. 3: (a) the DSP 208 causes the AMP 210 to output signals, which the speaker 112 receives and outputs as a sound wave, and those signals and the sound wave are denoted as $s_1(n)=x_1(n)$ for a time frame n; (b) $h_{21}(n)$ models an acoustic echo path of $s_1(n)$ from the speaker 112 to the microphone 116, so that the microphone 116 receives the acoustic echo=$h_{21}(n)*s_1(n)$ as a part of ambient noise from the environment around the microphone 116, where * is a convolution operator; (c) $s_2(n)$ denotes a remaining part (without the acoustic echo $h_{21}(n)*s_1(n)$ components) of the sound wave of the environment around the microphone 116 (e.g., the voice, if present, of the user 114, and ambient noise); and (d) accordingly, the microphone 116 receives $x_2(n)$, which is a sum of $s_2(n)$ and $h_{21}(n)*s_1(n)$, so that $x_2(n)$ denotes the sound wave of the environment around the microphone 116, including the acoustic echo $h_{21}(n)*s_1(n)$ components.

The acoustic echo path $h_{21}(n)$ is represented by a finite impulse response ("FIR") filter of length L as:

$$h_{21}(n)=[h_{21}^{0}(n),h_{21}^{1}(n),\ldots,h_{21}^{L-1}(n)]^T,$$

where the superscript on the filter coefficient denotes a tap index, and $[\bullet]^T$ denotes transposition. The FIR filter operates as a model of the environment around the microphone 116, by modeling an impulse response of a path from the speaker 112 to the microphone 116.

Figure 4:
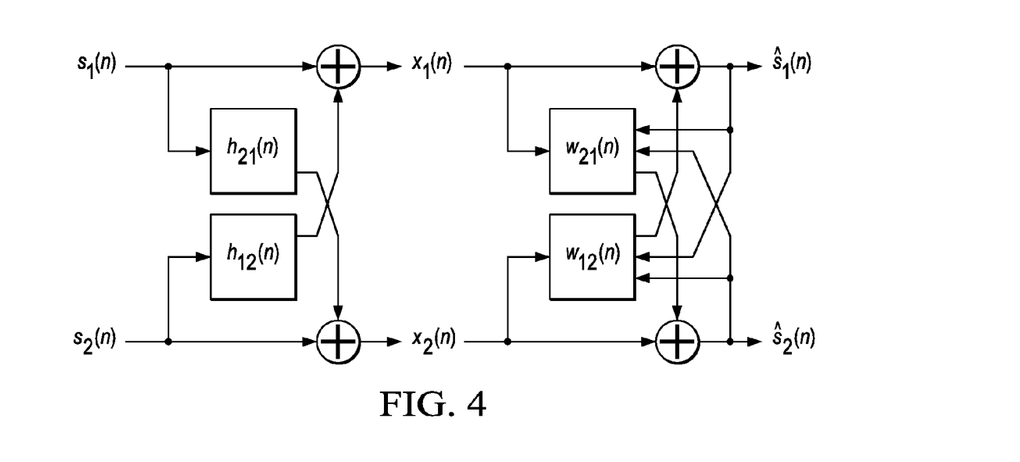
FIG. 4 is an information flow diagram of a first blind source separation ("BSS") operation of the system of FIG. 1.
Figure 5:
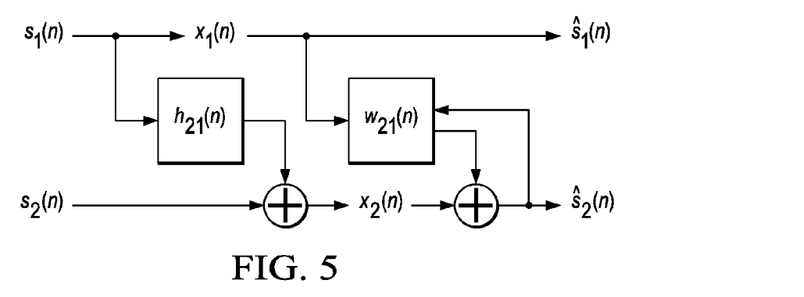
FIG. 5 is an information flow diagram of a second BSS operation of the system of FIG. 1.

Similarly, an estimate $w_{21}(n)$ of the acoustic echo path $h_{21}(n)$ is represented by an adaptive filter of length P as:

$$w_{21}(n)=[w_{21}^{0}(n),w_{21}^{1}(n),\ldots,w_{21}^{P-1}(n)]^T$$

where the subscript 21 is consistent with nomenclature of operations discussed hereinbelow in connection with FIGS. 4 and 5.

The DSP 208 is operable to compute $\hat{s}_2(n)$, which is an estimate of $s_2(n)$, by subtracting $w_{21}(n)*s_1(n)$ from $x_2(n)$, so that at least some of any acoustic echo $h_{21}(n)*s_1(n)$ in $x_2(n)$ is cancelled from $\hat{s}_2(n)$. Accordingly, if $w_{21}(n)=h_{21}(n)$, then all of the acoustic echo $h_{21}(n)*s_1(n)$ in $x_2(n)$ is cancelled from $\hat{s}_2(n)$, so that $\hat{s}_2(n)=s_2(n)$. In that manner, $\hat{s}_2(n)$ represents an estimate of the sound wave of the environment around the microphone 116 (e.g., the voice, if present, of the user 114, and ambient noise), while cancelling at least some of any acoustic echo $h_{21}(n)*s_1(n)$ therein.

As discussed hereinabove in connection with FIG. 2, the DSP 208 causes the encoder 212 to encode suitable digital information that is representative of $\hat{s}_2(n)$. Optionally, the DSP 208 writes $\hat{s}_2(n)$ (or such information) for storage on the computer-readable medium 216.

The DSP 208 is operable to compute $w_{21}(n)$ using a normalized least-mean squares ("NLMS") technique, as:

$$w_{21}^{k}(n)=w_{21}^{k}(n-1)+\alpha\frac{e(n)x_1^*(n-k)}{\sum_{i=0}^{P-1}|x_1(n-i)|^2},$$

for k=0, ..., P−1, where: (a) $\alpha$ is an adaptation constant; (b) $[\bullet]^*$ denotes complex conjugation; and (c) $e(n)=\hat{s}_2(n)$. However, while a double-talk condition occurs, computation of $w_{21}(n)$ using the NLMS technique is less accurate.

A double-talk condition occurs if the users 102 and 114 concurrently speak into the microphones 104 and 116, respectively. In that event, the speakers 112 and 118 concurrently output sound waves that communicate the voices of the users 102 and 114, respectively. To avoid interference from the double-talk condition: (a) a half-duplex restriction could be imposed to avoid the double-talk condition by permitting only one-way communication, but such restriction would diminish functionality; (b) $w_{21}(n)$ could be adjusted at a slower rate, but accuracy of $w_{21}(n)$ would be reduced, especially if the surrounding environment changes; and/or (c) a double-talk detector could suspend or slow adjustment of $w_{21}(n)$ during periods in which the double-talk condition occurs (e.g., by automatically varying a step size of the NLMS technique), but accuracy of $w_{21}(n)$ would be reduced (in comparison to other periods without the double-talk condition), and timely detection of a double-talk condition is challenging.

FIG. 4 is an information flow diagram of a first blind source separation ("BSS") operation of the DSP 208. In one example, if voice signals are mixed (e.g., partially mixed) with one another, then a BSS operation is useful for separating those voice signals from one another. In another example, if a voice signal is mixed with noise, then a BSS operation is useful for separating such voice signal from such noise.

FIG. 4 shows a BSS operation that has: (a) two inputs, namely $s_1(n)$ and $s_2(n)$; and (b) two outputs, namely $\hat{s}_1(n)$ and $\hat{s}_2(n)$. In the example of FIG. 4: (a) the sound waves $s_1(n)$ and $s_2(n)$ are partially mixed with one another; and (b) $x_1(n)$ and $x_2(n)$ are received by first and second microphones that are spatially separated from one another. Accordingly, in FIG. 4: (a) $h_{12}(n)*s_2(n)$ denotes acoustic echo components of $s_2(n)$ that are mixed with $s_1(n)$, so that $x_1(n)=s_1(n)+h_{12}(n)*s_2(n)$; (b) $h_{21}(n)*s_1(n)$ denotes acoustic echo components of $s_1(n)$ that are mixed with $s_2(n)$, so that $x_2(n)=s_2(n)+h_{21}(n)*s_1(n)$; and (c) $h_{21}(n)$ and $h_{12}(n)$ are represented by respective FIR filters, in the same manner as $h_{21}(n)$ is represented by an FIR filter in FIG. 3.

In the BSS operation of FIG. 4, the DSP 208 is operable to compute: (a) an estimate $w_{12}(n)$ of $h_{12}(n)$; and (b) an estimate $w_{21}(n)$ of $h_{21}(n)$. Moreover, the DSP 208 is operable to compute: (a) $\hat{s}_1(n)$, which is an estimate of $s_1(n)$, by subtracting $w_{12}(n)*s_2(n)$ from $x_1(n)$, so that at least some of the acoustic echo $h_{12}(n)*s_2(n)$ in $x_1(n)$ is cancelled from $\hat{s}_1(n)$; and (b)

$\hat{s}_2(n)$, which is an estimate of $s_2(n)$, by subtracting $w_{21}(n)*s_1(n)$ from $x_2(n)$, so that at least some of the acoustic echo $h_{21}(n)*s_1(n)$ in $x_2(n)$ is cancelled from $\hat{s}_2(n)$. Accordingly: (a) if $w_{12}(n)=h_{12}(n)$, then all of the acoustic echo $h_{12}(n)*s_2(n)$ in $x_1(n)$ is cancelled from $\hat{s}_1(n)$, so that $\hat{s}_1(n)=s_1(n)$; and (b) if $w_{21}(n)=h_{21}(n)$, then all of the acoustic echo $h_{21}(n)*s_1(n)$ in $x_2(n)$ is cancelled from $\hat{s}_2(n)$, so that $\hat{s}_2(n)=s_2(n)$.

In the BSS operation of FIG. 4, the DSP 208 iteratively adapts $w_{12}(n)$ and $w_{21}(n)$ to increase a statistical independence (e.g., to reduce a cross-correlation) between $\hat{s}_1(n)$ and $\hat{s}_2(n)$ in a frequency domain (e.g., based on second-order statistics and/or higher-order statistics). Accordingly, the DSP 208 iteratively adapts: (a) $w_{12}(n)$ in response to $x_2(n)$, $\hat{s}_1(n)$ and $\hat{s}_2(n)$; and (b) $w_{21}(n)$ in response to $x_1(n)$, $\hat{s}_1(n)$ and $\hat{s}_2(n)$. Mathematically, this statistical independence is represented by:

$$E\{\hat{s}_1(n)\hat{s}^*_2(n-m)\}=0; \forall m,$$

where $E\{\bullet\}$ denotes statistical expectation.

FIG. 5 is an information flow diagram of a second BSS operation of the DSP 208. In the example of FIG. 5, as in the example of FIG. 3: (a) $h_{21}(n)$ models the acoustic echo path of $s_1(n)$ from the speaker 112 to the microphone 116, so that the microphone 116 receives the acoustic echo=$h_{21}(n)*s_1(n)$ as a part of ambient noise from the environment around the microphone 116, and so that the acoustic echo $h_{21}(n)*s_1(n)$ components of $s_1(n)$ are mixed with $s_2(n)$; (b) $s_2(n)$ denotes the remaining part (without the acoustic echo $h_{21}(n)*s_1(n)$ components) of the sound wave of the environment around the microphone 116 (e.g., the voice, if present, of the user 114, and ambient noise); (c) accordingly, the microphone 116 receives $x_2(n)$, which is the sum of $s_2(n)$ and $h_{21}(n)*s_1(n)$, so that $x_2(n)$ denotes the sound wave of the environment around the microphone 116, including the acoustic echo $h_{21}(n)*s_1(n)$ components; and (d) $h_{21}(n)$ is represented by the FIR filter.

In the BSS operation of FIG. 5, the DSP 208 computes an estimate $w_{21}(n)$ of $h_{21}(n)$. Moreover, the DSP 208 computes $\hat{s}_2(n)$, which is an estimate of $s_2(n)$, by subtracting $w_{21}(n)*s_1(n)$ from $x_2(n)$, so that at least some of the acoustic echo $h_{21}(n)*s_1(n)$ in $x_2(n)$ is cancelled from $\hat{s}_2(n)$. Accordingly, if $w_{21}(n)=h_{21}(n)$, then all of the acoustic echo $h_{21}(n)*s_1(n)$ in $x_2(n)$ is cancelled from $\hat{s}_2(n)$, so that $\hat{s}_2(n)=s_2(n)$.

In the BSS operation of FIG. 5, the DSP 208 iteratively adapts $w_{21}(n)$ to increase a statistical independence (e.g., to reduce cross-correlation) between $\hat{s}_1(n)$ and $\hat{s}_2(n)$ in a frequency domain (e.g., based on second-order statistics and/or higher-order statistics), where $\hat{s}_1(n)=s_1(n)$ in the example of FIG. 5. Accordingly, the DSP 208 iteratively adapts $w_{21}(n)$ in response to $\hat{s}_1(n)$ and $\hat{s}_2(n)$.

For example, if the two signals $s_1(n)$ and $s_2(n)$ are stacked in a vector form as $s(n)=[s_1(n), s_2(n)]^T$, then the two received signals $x_1(n)$ and $x_2(n)$ can be: (a) modeled as convolutive mixtures of the two signals $s_1(n)$ and $s_2(n)$; and (b) expressed in matrix-vector form as $x(n)=H(n)*s(n)$, where $x(n)=[x_1(n), x_2(n)]^T$ is a received signal vector, * is the convolution operator, and a (2×2) mixing filter matrix of L-point impulse responses is:

$$H(n) = \begin{bmatrix} 1 & 0 \\ h_{21}(n) & 1 \end{bmatrix}$$

In the BSS operation, the DSP 208 computes a (2×2) unmixing filter matrix $W(n)$ of length P that separates the two signals $s_1(n)$ and $s_2(n)$, so that:

$$\hat{s}(n) = W(n)*x(n),$$

where:

$$W(n) = \begin{bmatrix} 1 & 0 \\ w_{21}(n) & 1 \end{bmatrix}$$

The DSP 208 transforms the time-domain convolutive mixture $x(n)$ to an instantaneous mixture in the frequency domain by computing its T-point short-time Fourier transform as:

$$x(\omega,m)=H(\omega)s(\omega,m),$$

where m is a block index. In practice, the DSP 208 computes $x(\omega, m)$ by:

$$x(\omega, m) = \sum_{\tau=0}^{T-1} \gamma(\tau)x(\beta T m + \tau)e^{-j2\pi\omega\tau/T},$$

for $\omega=1, \ldots, T$, where $\gamma(T)$ is a window function, and $\beta(0<\beta\leq1)$ is a data overlap factor.

The DSP 208 estimates a covariance matrix $R_x(\omega, k)$, assuming ergodicity of received data, using M possibly overlapping blocks of $x(\omega, m)$ as:

$$\hat{R}_x(\omega, k) = \frac{1}{M}\sum_{m=0}^{M-1} x(\omega, Mk+m)x^H(\omega, Mk+m),$$

for $k=0, \ldots, K-1$, where $(\bullet)^H$ denotes a conjugate transposition.

The un-mixing filter matrix $W(\omega)$ decorrelates the estimated source signals $\hat{s}_1(n)$ and $\hat{s}_2(n)$ by diagonalizing their covariance matrix as:

$$A_{\hat{s}}(\omega,k)=W(\omega)\hat{R}_x(\omega,k)W^H(\omega).$$

For non-stationary signals, the DSP 208 applies such independent decorrelation equations for K sufficiently separated time intervals. With an over-determined least-squares technique, the DSP 208 computes the un-mixing filter matrix $W(\omega)$ for each frequency bin $\omega(\omega=1, \ldots, T)$ that simultaneously satisfies the K decorrelation equations as:

$$\hat{W}(\omega) = \arg\min_{W(\omega)} \sum_{k=1}^{K} \|V(\omega, k)\|^2,$$

where $\|\bullet\|^2$ is a squared Frobenius norm (sum of squares of all elements), and $V(\omega, k)$ is an error computed by:

$$V(\omega, k) = W(\omega)\hat{R}_x(\omega, k)W^H(\omega) - \text{diag}[W(\omega)\hat{R}_x(\omega, k)W^H(\omega)],$$

where diag[●] is a diagonal matrix formed by extracting diagonal elements of the matrix argument. Notably, in such decorrelation equation: (a) only two variables are unknown, namely $W_{21}(\omega)$ and $As_2(\omega, k)$; and (b) in view of the matrix's symmetry, such decorrelation equation has three constraints. Accordingly, the DSP 208 is suitable for performing the BSS operation in real-time implementations (e.g., K may be selected as small as 1 to satisfy the over-determined condition).

In one embodiment, the DSP 208 computes the least-squares solution according to a steepest descent technique as:

$$W^{(l+1)}(\omega) = W^{(l)}(\omega) - \mu(\omega) \cdot \frac{\partial}{\partial W^{(l)}*(\omega)} \left\{ \sum_{k=1}^{K} \|V^{(l)}(\omega, k)\|^2 \right\}$$

for w=1, ..., T, using a step size of:

$$\mu(\omega) = \frac{\eta}{\sum_{k=1}^{K} \|\hat{R}_x(\omega, k)\|^2},$$

where η is a normalized step size.

Per iteration, the DSP 208 adapts only $W_{21}(\omega)$ of the $W(\omega)$ off-diagonal elements, while the remaining $W(\omega)$ elements stay at their initial values. Accordingly, the filter convergence stays on track, even if the user 114 is not then-currently speaking into the microphone 116 (e.g., during a far-end single-talk condition in which the user 102 is then-currently speaking into the microphone 104). The DSP 208 customizes a respective step size per frequency bin ω to promote overall convergence of its computation. At convergence, the DSP 208 performs an inverse Fourier transform to compute the time-domain signal $\hat{s}_2(n)$.

Figure 6:
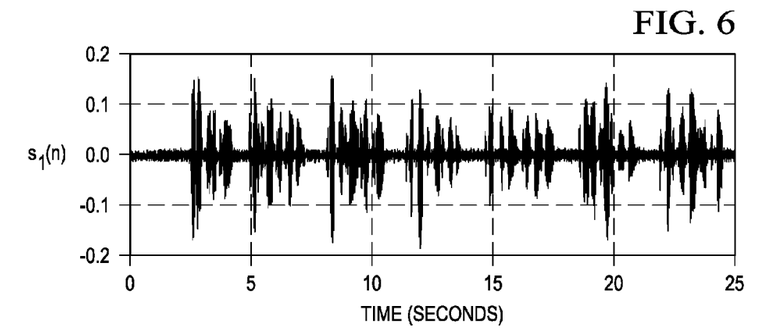
FIG. 6 is a graph of an example far-end signal.
Figure 7:
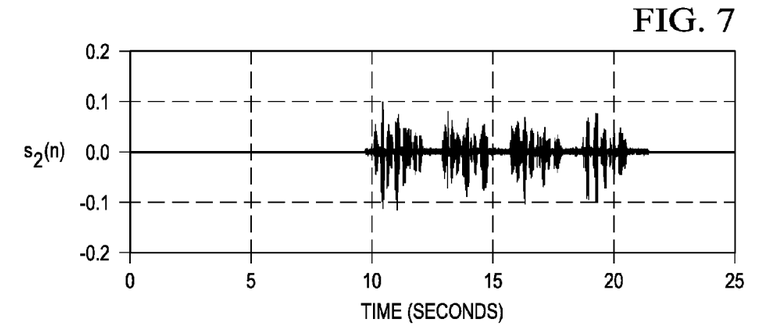
FIG. 7 is a graph of an example near-end signal.

FIG. 6 is a graph of an example of $s_1(n)$, which is a far-end (from perspective of the DSP 208) signal from a male user 102. FIG. 7 is a graph of an example of $s_2(n)$, which is a near-end (from perspective of the DSP 208) signal from a female user 114. As shown in the example of FIGS. 6 and 7, before time=~2.5 seconds, an idle condition occurs, in which neither the user 102 nor the user 114 is then-currently speaking, so that respective voices of the user 102 and the user 114 are absent from (not present in) the sound waves $s_1(n)$ and $s_2(n)$.

From time=~2.5 seconds until time=~10 seconds, a single-talk condition occurs, in which: (a) the user 102 is then-currently speaking into the microphone 104, so that a voice of the user 102 is present in the sound wave $s_1(n)$; and (b) the user 114 is not then-currently speaking into the microphone 116, so that a voice of the user 114 is absent from the sound wave $s_2(n)$. From time=~10 seconds until time=~21 seconds, a double-talk condition occurs, in which: (a) the user 102 is then-currently speaking into the microphone 104, so that the voice of the user 102 is present in the sound wave $s_1(n)$; and (b) the user 114 is then-currently speaking into the microphone 116, so that the voice of the user 114 is present in the sound wave $s_2(n)$. After time=~21 seconds, the single-talk condition occurs again.

Measurements of AEC performance include: (a) AEC performance during a double-talk condition; (b) convergence rate; and (c) AEC performance if the adaptive filter's length under-estimates the acoustic echo $h_{21}(n)*s_1(n)$. In the example of FIGS. 6 and 7, length of the acoustic echo $h_{21}(n)*s_1(n)$ is ~30 msec. The average far-end signal to double-talk ratio is ~5 dB. One performance indicator is adaptive filter misalignment, which may be computed as:

$$20 \log 10 \frac{\|h_{21} - w_{21}\|}{\|h_{21}\|}.$$

In one example of the NLMS technique, α=0.5. In one example of the BSS operation of the DSP 208, η=0.5, T=512, β=0.5 (50% overlap), and M=10. For comparing the NLMS technique with the BSS operation of the DSP 208, a Hamming window function may be used for γ(T), and an initial value of P=256.

Figure 8:
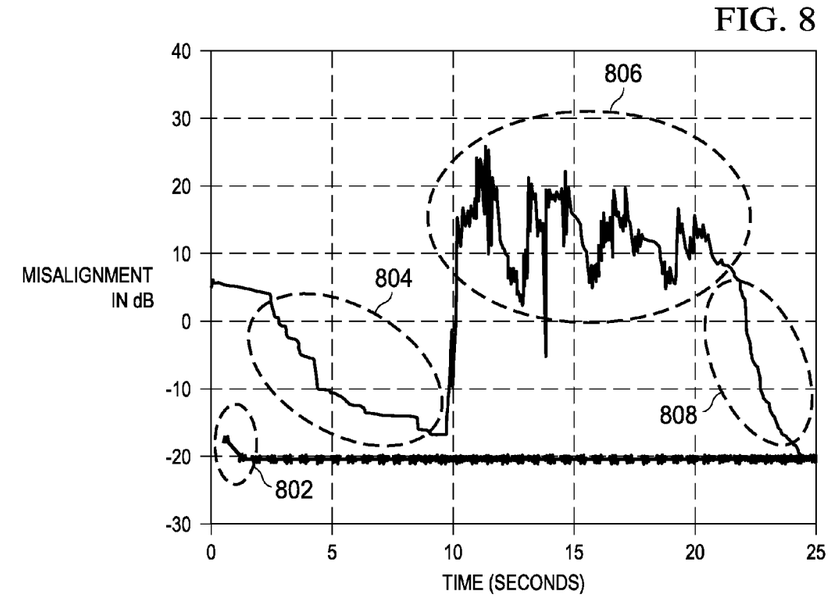
FIG. 8 is a graph of example misalignments of the NLMS technique and the BSS operation.

FIG. 8 is a graph of example misalignments of the NLMS technique and the BSS operation of the DSP 208. As shown in FIG. 8, the BSS operation of the DSP 208 achieves faster convergence than the NLMS technique. For example, with the BSS operation of the DSP 208, in response to $s_1(n)$ and $s_2(n)$ from the example of FIGS. 6 and 7, the misalignment quickly converges to −20 dB (as indicated by dashed enclosure 802) and remains stable during the single-talk condition and the double-talk condition, even if P is reduced from 256 to 128. By comparison, with the NLMS technique, in response to $s_1(n)$ and $s_2(n)$ from the example of FIGS. 6 and 7, the misalignment: (a) slowly converges during the first single-talk condition, as indicated by dashed enclosure 804; (b) suddenly rises and becomes unstable during the double-talk condition, as indicated by dashed enclosure 806; and (c) slowly converges during the second single-talk condition, as indicated by dashed enclosure 808.

Accordingly, in the BSS operation of FIG. 5, the DSP 208 successfully achieves AEC by iteratively adapting $w_{21}(n)$ to increase the statistical independence between $\hat{s}_1(n)$ and $\hat{s}_2(n)$ in the frequency domain, irrespective of whether the conversation switches between the idle condition, single-talk condition and/or double-talk condition, and without: (a) requiring a double-talk detector; or (b) suspending or slowing adjustment of $w_{21}(n)$ during periods in which the double-talk condition occurs. Moreover, the BSS operation of FIG. 5 is robust against under-estimation (by the adaptive filter's length) of the acoustic echo $h_{21}(n)*s_1(n)$. In view of its faster convergence and relatively efficient processing, the BSS operation of FIG. 5 is suitable for implementation on a low-power handheld device that performs voice communication operations with a loud speaker.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by an information handling system for acoustic echo cancellation, the method comprising:
    in response to a first signal, outputting a first sound wave;
    receiving a second sound wave that includes an acoustic echo of the first sound wave;
    computing an estimate of the acoustic echo;
    in response to the second sound wave, outputting a second signal that represents the second sound wave minus the estimate of the acoustic echo; and
    iteratively adapting the estimate of the acoustic echo to increase a statistical independence between the first signal and the second signal in a frequency domain based on second-order statistics without higher-order statistics, irrespective of whether a first voice is present in the first sound wave, and irrespective of whether a second voice is present in the second sound wave.

2. The method of claim 1, wherein the first voice is a voice of a first human user, and the second voice is a voice of a second human user.

3. The method of claim 1, wherein outputting the first sound wave includes: outputting the first sound wave from a speaker.

4. The method of claim 3, wherein receiving the second sound wave includes: receiving the second sound wave from a microphone.

5. The method of claim 4, wherein the second sound wave includes the acoustic echo as a part of ambient noise from an environment around the microphone.

6. The method of claim 5, wherein outputting the second signal includes: in response to a model of the environment around the microphone, computing the estimate of the acoustic echo.

7. The method of claim 6, wherein the model is for modeling an impulse response of a path from the speaker to the microphone.

8. The method of claim 1, wherein outputting the second signal includes: outputting the second signal through a network to a source of the first signal.

9. The method of claim 1, wherein iteratively adapting the estimate of the acoustic echo includes: iteratively adapting the estimate of the acoustic echo to reduce cross-correlation between the first signal and the second signal.

10. A system for acoustic echo cancellation, the system comprising:
    at least one device for: in response to a first signal, outputting a first sound wave; receiving a second sound wave that includes an acoustic echo of the first sound wave; computing an estimate of the acoustic echo; in response to the second sound wave, outputting a second signal that represents the second sound wave minus the estimate of the acoustic echo; and iteratively adapting the estimate of the acoustic echo to increase a statistical independence between the first signal and the second signal in a frequency domain based on second-order statistics without higher-order statistics, irrespective of whether a first voice is present in the first sound wave, and irrespective of whether a second voice is present in the second sound wave.

11. The system of claim 10, wherein the first voice is a voice of a first human user, and the second voice is a voice of a second human user.

12. The system of claim 10, wherein the device includes a speaker for outputting the first sound wave.

13. The system of claim 12, wherein the device includes a microphone for receiving the second sound wave.

14. The system of claim 13, wherein the second sound wave includes the acoustic echo as a part of ambient noise from an environment around the microphone.

15. The system of claim 14, wherein outputting the second signal includes: in response to a model of the environment around the microphone, computing the estimate of the acoustic echo.

16. The system of claim 15, wherein the model is for modeling an impulse response of a path from the speaker to the microphone.

17. The system of claim 10, wherein outputting the second signal includes: outputting the second signal through a network to a source of the first signal.

18. The system of claim 10, wherein iteratively adapting the estimate of the acoustic echo includes: iteratively adapting the estimate of the acoustic echo to reduce cross-correlation between the first signal and the second signal.

19. A computer program product for acoustic echo cancellation, the computer program product comprising:
    a non-transitory computer-readable storage medium; and
    a computer-readable program stored on the non-transitory computer-readable storage medium, wherein the computer-readable program is processable by an information handling system for causing the information handling system to perform operations including: in response to a first signal, outputting a first sound wave; receiving a second sound wave that includes an acoustic echo of the first sound wave; computing an estimate of the acoustic echo; in response to the second sound wave, outputting a second signal that represents the second sound wave minus the estimate of the acoustic echo; and iteratively adapting the estimate of the acoustic echo to increase a statistical independence between the first signal and the second signal in a frequency domain based on second-order statistics without higher-order statistics, irrespective of whether a first voice is present in the first sound wave, and irrespective of whether a second voice is present in the second sound wave.

20. The computer program product of claim 19, wherein the first voice is a voice of a first human user, and the second voice is a voice of a second human user.

21. The computer program product of claim 19, wherein outputting the first sound wave includes: outputting the first sound wave from a speaker.

22. The computer program product of claim 21, wherein receiving the second sound wave includes: receiving the second sound wave from a microphone.

23. The computer program product of claim 22, wherein the second sound wave includes the acoustic echo as a part of ambient noise from an environment around the microphone.

24. The computer program product of claim 23, wherein outputting the second signal includes: in response to a model of the environment around the microphone, computing the estimate of the acoustic echo.

25. The computer program product of claim 24, wherein the model is for modeling an impulse response of a path from the speaker to the microphone.

26. The computer program product of claim 19, wherein outputting the second signal includes: outputting the second signal through a network to a source of the first signal.

27. The computer program product of claim 19, wherein iteratively adapting the estimate of the acoustic echo includes: iteratively adapting the estimate of the acoustic echo to reduce cross-correlation between the first signal and the second signal.

* * * * *